United States Patent

Wu et al.

[11] Patent Number: 5,312,670
[45] Date of Patent: May 17, 1994

[54] FULLY ISOTROPIC LAMINATES AND QUASI-HOMOGENEOUS ANISOTROPIC LAMINATES

[76] Inventors: Kuang-Ming Wu, 1321 Timberly La., McLean, Va. 22102; Brian L. Avery, 898 Read St., Attleboro, Mass. 02703

[21] Appl. No.: 817,385

[22] Filed: Jan. 6, 1992

[51] Int. Cl.$^5$ .................................... B32B 7/00
[52] U.S. Cl. .................................... 428/141; 428/174; 428/411.1; 428/910
[58] Field of Search ................ 428/174, 414, 141, 910

[56] References Cited

U.S. PATENT DOCUMENTS

| | | | |
|---|---|---|---|
| 3,768,760 | 10/1973 | Jensen | 428/174 X |
| 4,621,980 | 11/1986 | Reavely et al. | 416/226 |
| 4,848,745 | 7/1989 | Bohannan et al. | 273/72 R |
| 4,882,230 | 11/1989 | Warner | 428/516 |
| 4,946,721 | 8/1990 | Kindervater et al. | 428/36.1 |
| 5,126,190 | 6/1992 | Sakatani et al. | 428/225 |

Primary Examiner—Paul J. Thibodeau
Assistant Examiner—H. Thi Lê

[57] ABSTRACT

The present invention pertains to the layup of laminates that possesses i. concomitant stiffness isotropy in extension, shear, bending, and twisting; and
ii. identical stiffness anisotropy in extension and bending as well as in shear and twisting.

Although both laminate layups have distinctive applications as load-carrying structures, the approaches and models that generate these layups are closely related.

5 Claims, 4 Drawing Sheets

EIL
(Prior art)

FIL

Fig. 5(a)          Fig. 5(b)

QHAL

FULLY ISOTROPIC LAMINATES AND QUASI-HOMOGENEOUS ANISOTROPIC LAMINATES

BACKGROUND OF THE INVENTION

This invention pertains to the layup of the fully isotropic laminates and quasi-homogeneous anisotropic laminates.

Figure 1:
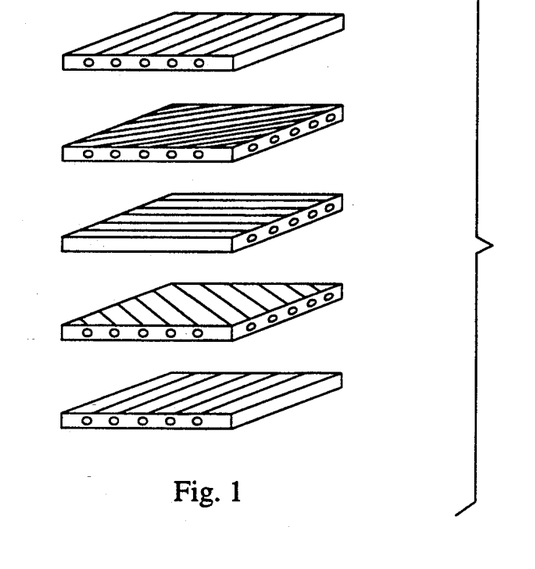
FIG. 1 shows an exploded view of a flat laminate.

A laminate is a flat plate or curved shell consisting of two or more plies stacked and bonded as an integral component for structural applications. Each ply is a uniform-thickness layer of an orthotropic or anisotropic material. FIG. 1 shows an exploded view of a typical flat laminate. The arrangement of the material, thickness, orientation, and stacking sequence of the plies is referred to as the "layup" of the laminate. The layup of a laminate is generally tailored to match the stiffness and strength requirements for loadings in various directions.

Figure 2A:
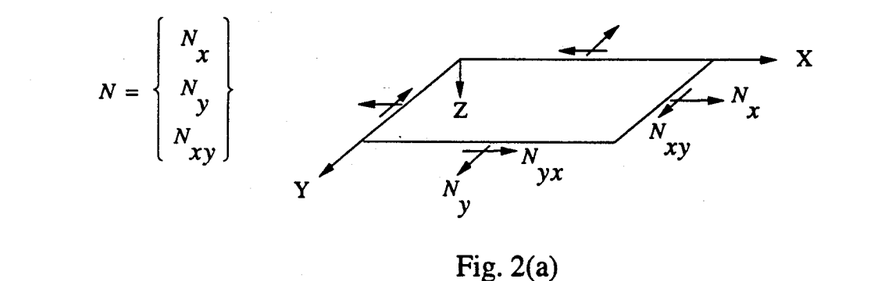
FIGS. 2(a) and 2(b) illustrate the definitions of the coordinate system and the mechanical loading on a flat laminate.
Figure 2B:
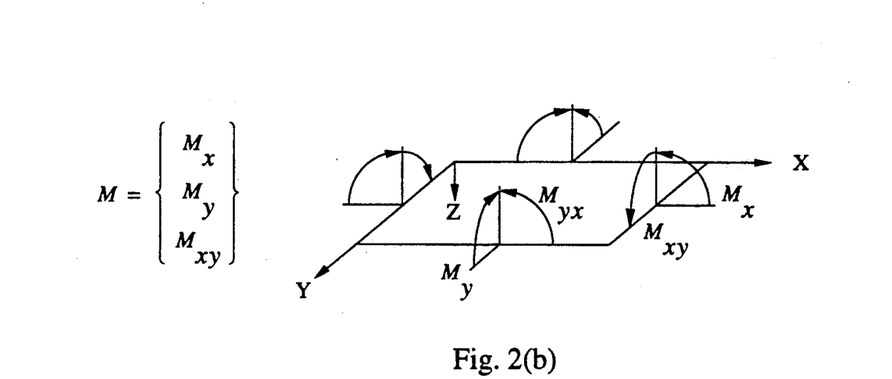

FIGS. 2(a) and 2(b) illustrate the definitions of the coordinate system and the mechanical loadings (extension, shear, bending, and twisting) on a flat laminate.

Fiber-reinforced composite laminates such as graphite/epoxy and Kevlar/epoxy are ideal for structural applications where high strength-to-weight and stiffness-to-weight ratios are desired for weight reduction (e.g. aircraft and spacecraft structures). In addition, composite laminates are superior in corrosion resistance, acoustic damping, fatigue life, thermal insulation, and many other applications.

Figure 3:
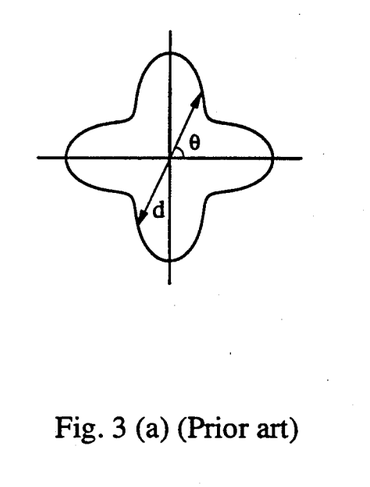
Figure 3B:
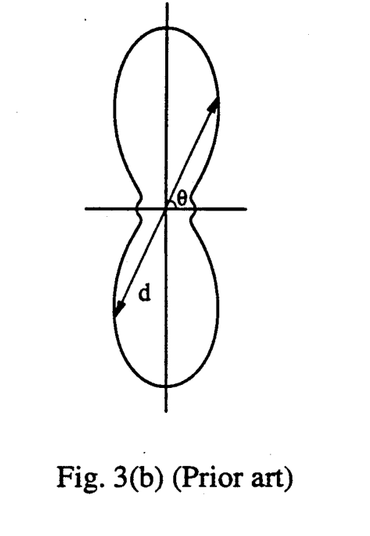

FIGS. 3(a) and 3(b) show polar plots of the extensional and bending stiffnesses of an example graphite/epoxy laminate, respectively. The length of d indicates the magnitude of the laminate stiffness with respect to the loading in direction $\theta$. Since the laminate stiffnesses vary with $\theta$, the laminate is said to be anisotropic. Note that the degree of anisotropy in the extension and bending stiffnesses are different, which is typical of composite laminates.

Figure 4A:
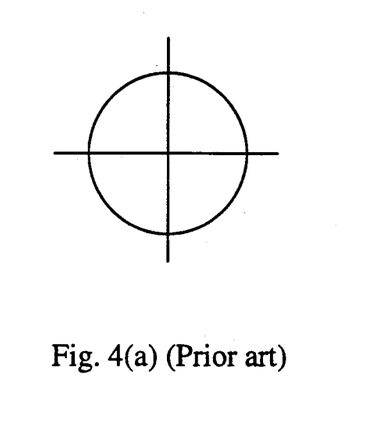
Figure 4B:
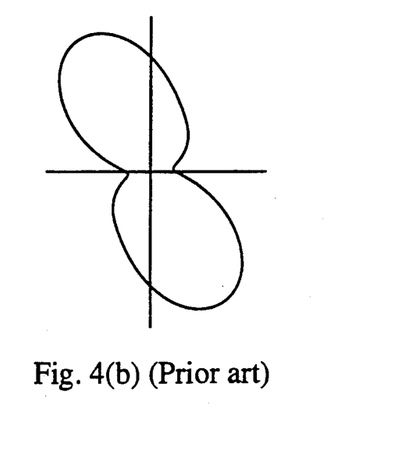

The concept of in-plane isotropic laminates was discovered by F. Weiren and C. B. Norris as described in "Mechanical Properties of a Laminate Designed to be Isotropic," Report No. 1841, Forest Products Laboratory, Forest Service, U.S. Department of Agriculture, May 1953. FIGS. 4(a) and 4(b) show plots of the extensional and the bending stiffness of such laminates, respectively. In-plane isotropy is characterized by a circular pattern of extensional stiffness; while out-of-plane bending stiffness remains anisotropic. Hence, for the past few decades, a laminates with in-plane isotropy and a symmetric layup has been referred to as an "extensionally isotropic laminate" (hereinafter designated as EIL).

As of today, the tailoring technology for composite laminate is in a state of continuing improvement for meeting various engineering requirements.

The present invention discovers the layups of i. the fully isotropic laminate (hereinafter designated as FIL) that exhibits the stiffness isotropy —as in a homogeneous isotropic plate—concomitant in extension, shear, bending, and twisting; and ii. the quasi-homogeneous anisotropic laminate (hereinafter designated as QHAL) that has identical stiffness anisotropy—as in a homogeneous anisotropic plate—in extension and bending as well as in shear and twisting.

Figure 5A:
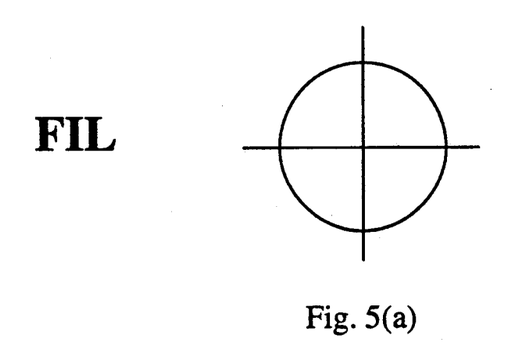
Figure 5B:
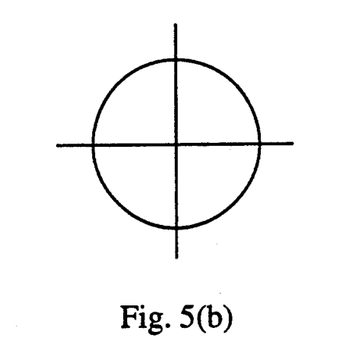

The FIL layup developed in the present invention combines an EIL layup with out-of-plane isotropy (bending and twisting). As illustrated in FIGS. 5(a) and 5(b), both extensional and bending stiffnesses of an FIL are indicated by circles for isotropy. The isotropy also exists in the shear and twisting stiffnesses of an FIL layup; we thus refer to the layup as the fully isotropic laminate.

Figure 6A:
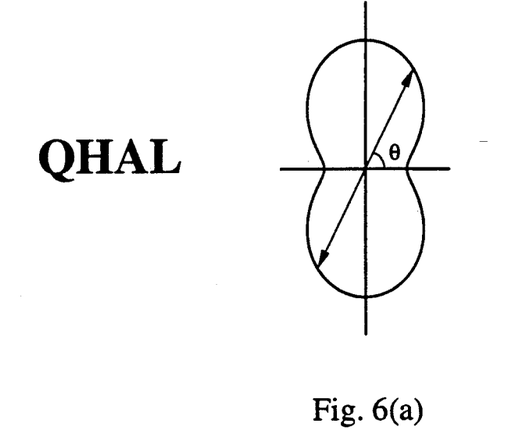
Figure 6B:
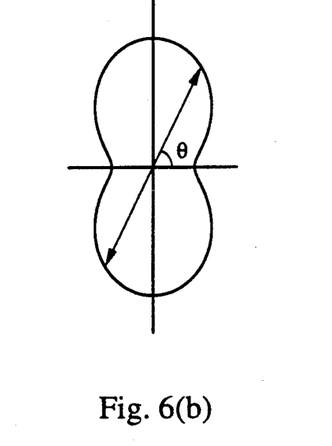

The QHAL layup developed in the present invention provides identical anisotropy in a laminate for both in-plane and out-of-plane stiffnesses. The term "identical anisotropy" stipulates that the stiffness directionalities are identical with respect to extension and bending, as well as to shear and twisting. FIGS. 6(a) and 6(b) show polar plots of the extensional and bending stiffnesses of a QHAL, respectively. Although both stiffnesses are anisotropic, the anisotropy is identical with respect to the angle $\theta$. This characteristic has been found only in homogeneous anisotropic plates; but has never been achieved with a multiply multiangle laminate. We thus refer to the layup as the quasi-homogeneous anisotropic laminate.

The FIL and the QHAL have distinctive applications for load-carrying laminates, i. An FIL provides the same stiffness reinforcement in all directions, which eliminates the concern for the "weak aspect" in the structural element and eases the engineering consideration of composite laminates.

ii. A QHAL, with identical anisotropy for both in-plane and out-of-plane stiffnesses, provides the maximum (and minimum) in-plane and out-of-plane reinforcements in the same direction. Thus, a QHAL is a layup for maximum weight reduction in a laminated structure.

The approaches and models for generating these layups are closely related; they are described in layer sections.

In a 1979 General Motors research report (EM-429, GM restricted), "Isotropic Composite Plates—A Conceptual Approach," K. M. Wu, one of the inventors of the present invention, described the approach for developing the FIL. However, due to an incomplete solution scheme, no FIL was discovered.

U.S. Pat. No. 4,882,230 (1989) to S. B. Warner relates to a process for producing a multilayer polymeric film having dead bend characteristics which are substantially planar (in-plane) isotropic. According to the patent, the highly oriented polymeric films are laminated to form a good food wrap that can remain in the deformed state. Except for including the publicized concept of in-plane isotropy and the method of masking dead bend polymeric film, this process involves no technology that could lead to any part of the present invention.

SUMMARY OF THE INVENTION

It is an object of the present invention to provide a multiply multiangle laminate that is in the form of a flat plate or a curved shell.

A further object of the present invention is to provide a multiply multiangle laminate with the same stiffness in all directions, which eliminates the concern for the "weak aspect" in the structural element and eases the engineering consideration of composite laminates.

An additional object of the present invention is to provide a multiply multiangle laminate with maximum (and minimum) in-plane and out-of-plane stiffness reinforcements in the same direction, which provides the maximum weight reduction is a structural component.

Accordingly, the present invention discovers the layup of i. the fully isotropic laminate that exhibits the concomitant stiffness isotropy in extension, shear, bending, and twisting; and ii. the quasi-homogeneous anisotropic laminate that has identical stiffness anisotropy in extension and bending as well as in shear and twisting.

These objects and other features will be apparent to one having ordinary skill in the art form reading the descriptions and claims below.

In this application:

"Midplane" refers to the plane containing all the midpoints in the thickness direction of the laminate;

"Extensional stiffness" relates the extensional force intensity on a laminate to the extensional strain on the laminate midplane;

"Shear stiffness" relates the shear force intensity on a laminate to the shear strain on the laminate midplane;

"Bending stiffness" relates the bending moment intensity on a laminate to the bending curvature on the laminate midplane;

"Twisting stiffness" relates the twisting moment intensity on a laminate to the twisting curvature on the laminate midplane.

"Isotropy" refers to material properties that are the same in every direction;

"Orthotropy" refers to material properties that vary with direction and have mutually perpendicular planes of material symmetry;

"Anisotropy" refers to material properties that vary with direction and have no plane of material symmetry;

"Weighting factor" is a conventional mathematical term and will be illustrated below.

BRIEF DESCRIPTION OF THE DRAWING

FIGS. 3(a) and 3(b) illustrate the extensional and the bending stiffnesses of an ordinary composite laminate (prior art), respectively.

FIGS. 4(a) and 4(b) illustrate the extensional and the bending stiffnesses of an EIL (prior art), respectively.

FIGS. 5(a) and 5(b) illustrate the extensional and the bending stiffnesses of an FIL, respectively.

FIGS. 6(a) and 6(b) illustrate the extensional and the bending stiffnesses of a QHAL, respectively.

DETAILED DESCRIPTION OF THE INVENTION

1. Fully Isotropic Laminate (FIL)

1.1. Definition

In classical lamination theory, the macromechanical behavior of a thin laminate is characterized by an extensional/shear stiffness matrix A, a coupling stiffness matrix B, and a bending/twisting stiffness matrix D in a force-deformation relation:

$$\begin{pmatrix} N \\ M \end{pmatrix} = \begin{bmatrix} A & B \\ B & D \end{bmatrix} \begin{pmatrix} \epsilon \\ \kappa \end{pmatrix} \quad (1)$$

In this relation, N and M denote the force and moment intensities through the laminate thickness as shown in FIGS. 2(a) and 2(b), and $\epsilon$ and $\kappa$ represent the strains and curvatures at the midplane of the laminate. A, B, and D are three matrices, each with dimension $3 \times 3$, computed from the ply material properties and the laminate layup. The indicate the characteristics of the matrix, these three matrices are ordinarily expressed in indicial notation, i.e. $A_{ij}$, $B_{ij}$, and $D_{ij}$ with $i,j = 1,2,3$ indicating the numbers of rows and columns in the matrices. In general, i. these three matrices are independent of one another.

ii. each matrix has six independent coefficients, which amounts to a total of 18 independent coefficients.

However, when applying them to the mechanical analysis of a homogeneous isotropic plate, we obtain the following constraint conditions among the three stiffness matrices:

Isotropic extensional/shear (in-plane) stiffness $$A_{ij} = \begin{bmatrix} A_{11} & A_{12} & 0 \\ A_{12} & A_{11} & 0 \\ 0 & 0 & (A_{11} - A_{12})/2 \end{bmatrix} \quad (2)$$

Null coupling stiffness $$B_{ij} = \begin{bmatrix} 0 & 0 & 0 \\ 0 & 0 & 0 \\ 0 & 0 & 0 \end{bmatrix} = 0 \quad (3)$$

Isotropic bending/twisting (out-of-plane) stiffness $$D_{ij} = \frac{t^2}{12} \begin{bmatrix} A_{11} & A_{12} & 0 \\ A_{12} & A_{11} & 0 \\ 0 & 0 & (A_{11} - A_{12})/2 \end{bmatrix} = \frac{t^2}{12} A_{ij} \quad (4)$$

where t is the total thickness of the plate. Note that, for a homogeneous isotropic plate, i. $A_{ij}$ and $D_{ij}$ are no longer independent of each other; instead they are linked by the constant $t^2/12$. In addition, $B_{ij}$ is reduced to a null matrix.

ii. Throughout all three matrices, there are only two independent coefficients, i.e. $A_{11}$ and $A_{12}$.

The above constraints are quite restrictive, however, any laminate with three matrices satisfying the conditions in Equations (2) through (4) would have a macromechanical behavior identical to that of a homogeneous isotropic plate. We thus define this type of laminate, upon its invention, as the fully isotropic laminate.

1.2 Approach and Model

As indicated in the Background of the Invention, the development of FILs is based on improvements over EILs. Hence a brief description of EILs is provided in the following as a prerequisite for understanding.

An EIL is a laminate layup consisting of 2 MN equal-thickness plies of the same orthotropic or anisotropic material. The factor of 2 is for the layup symmetry with respect to its midplane. Each half of the laminate consists of MN plies, with $M(\geq 1)$ plies aligned at each of the $N(\geq 3)$ orientation angles, with the orientation angles equally spaced by $\pi/N$. Such a layup arrangement assures that an EIL satisfy both Equations (2) and (3) for in-plane isotropy and null coupling.

For an EIL layup with three ply orientation angles ($N=3$), the minimum number ($M=1$) of plies (2MN) is 6. As the ply numbers of each angle (M) increases, there can be 12, 18, ... or more plies in the layup with an increment of 6 plies. Hence the minimum number of plies in an EIL with N ply angles is 2N, with possible larger numbers of plies at increments of 2N. Table 1 lists the ply numbers of a few EILs for further clarification.

TABLE 1

The Numbers of Plies in EILs

| N | Characteristic Ply Angles | Number of Plies (2MN) | | | |
|---|---|---|---|---|---|
| | | M = 1 | M = 2 | M = 3 | ... |
| 3 | 0°, ±60° | 6 | 12 | 18 | ... |
| 4 | 0°, ±45°, 90° | 8 | 16 | 24 | ... |
| 5 | 0°, ±36°, ±72° | 10 | 20 | 30 | ... |
| ... | ... | | | | |

To obtain an FIL, we must vary ("shuffle") the stacking sequences of the EILs until Equation (4) is also satisfied. Note the following:

i. Varying the stacking sequence without changing any ply orientation angle preserves the in-plane extensional/shear isotropy required by Equation (2).

ii. Only the stacking sequence in half of a layup can be varies independently; the other half must be stacked symmetrically to assure that $B_{ij}=0$ as required by Equations (3).

As an example, Table 2 lists all combinations of the stacking sequence that can be obtained by shuffling the 6-ply EIL. Due to the requirement of symmetry, only half of the layup (3 plies) can be varied; the total number of stacking sequences equals to the factorial of 3 (3!), which is 6.

TABLE 2

Stacking Sequence Combinations of the π/3-type 6-ply EIL

| Stacking Sequence | Ply ID | | |
|---|---|---|---|
| | 1 | 2 | 3 |
| 1 | 0° | 60° | −60° |
| 2 | 0° | −60° | 60° |
| 3 | 60° | 0° | −60° |
| 4 | 60° | −60° | 0° |
| 5 | −60° | 0° | 60° |
| 6 | −60° | 60° | 0° |

As shown in the table, for an EIL with few plies, the possible combinations of stacking sequences are limited; so an FIL may not exist. However, the combinations of stacking sequences increase rapidly as the number of plies increases. Hence, the possibility of finding an FIL layup increases as the number of plies increases.

Weighting Factors

Figure 7:
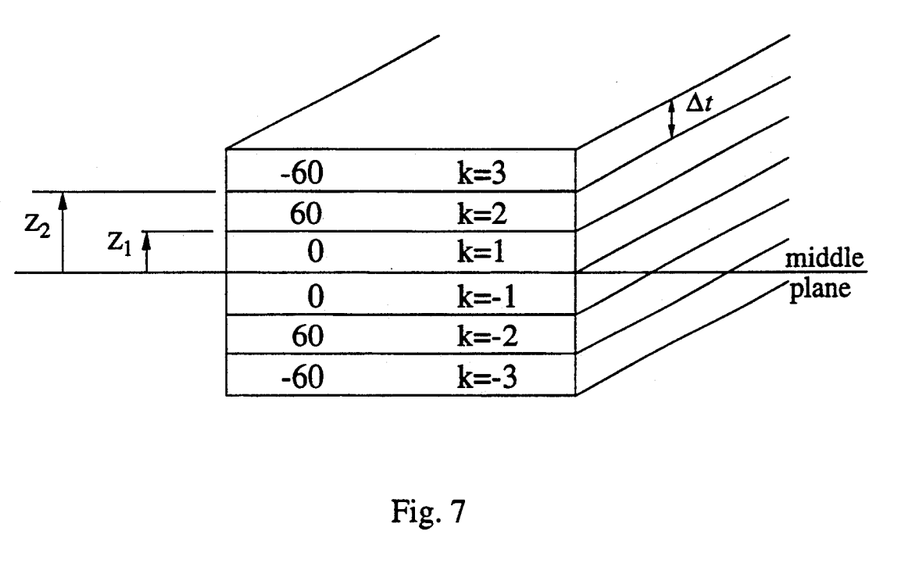
FIG. 7 illustrates the stacking sequence of a 6-ply EIL.

Quantitatively, the approach to obtain an FIL can be best illustrated by examining the $A_{ij}$ and $D_{ij}$ matrices of the 6-ply EIL that has a stacking sequence of (−60°,60°,0°,0°,60°,−60°) as illustrated in FIG. 7. Because each ply is of uniform thickness $\Delta t$ and the layup is symmetric, we can compute the $A_{ij}$ using the formula in the technical paper "Fully Isotropic Composite Laminates and Equivalent Homogeneous Anisotropic Plates" that was submitted by the present inventors to the *Journal of Composite Materials* in July 1991 (Attachment 3).

$$A_{ij} = 2 \sum_{k=1}^{3} (\overline{Q}_{ij})_k (z_k - z_{k-1}) \quad (5)$$
$$= 2 \sum_{k=1}^{3} (\overline{Q}_{ij})_k \Delta t$$
$$= 2(\overline{Q}_{ij}^{(0)} + \overline{Q}_{ij}^{(60)} + \overline{Q}_{ij}^{(-60)}) \Delta t$$

where $\overline{Q}_{ij}^{\theta}$ with i,j=1,2,3, is a 3×3 matrix that represents the transformed stiffness of the ply at orientation angle θ with respect to the laminate coordinate system, and $Z_k$ and $Z_{k-1}$ are the thickness coordinates of the upper and lower surfaces of ply k as illustrated in FIG. 7.

In the development of in-plane isotropy, F. Weiren and C. B. Norris proved (Attachment 1) that $$\overline{Q}_{ij}^{(0)} + \overline{Q}_{ij}^{\pi/N} + \ldots + \overline{Q}_{ij}^{(N-1)\pi/N} (N \geq 3)$$

is an isotropic matrix. Therefore, for N=3, $\overline{Q}_{ij}^{(0)} + \overline{Q}_{ij}^{(60)} + \overline{Q}_{ij}^{(-60)}$ is isotropic, which renders $A_{ij}$ isotropic as shown in Equation (2). This proof for isotropy is valid for both orthotropic and anisotropic ply materials as long as each $\overline{Q}_{ij}^{\theta}$ is "weighted" or "multiplied" by the identical factors 1:1:1 is in Equation (5).

The condition of equal weighting of $\overline{Q}_{ij}^{\theta}$ may not exist in the computation of $D_{ij}$. For instance, $$D_{ij} = \frac{2}{3} \sum_{k=1}^{3} (\overline{Q}_{ij})_k (z_k^3 - z_{k-1}^3) \quad (5)$$
$$= \frac{2}{3} \sum_{k=1}^{3} (\overline{Q}_{ij})_k (3k^2 - 3k + 1)(\Delta t)^3$$
$$= \frac{2}{3} (1\overline{Q}_{ij}^{(0)} + 7\overline{Q}_{ij}^{(60)} + 19\overline{Q}_{ij}^{(-60)})(\Delta t)^3$$

In the above equation the ratio of weighting factors 1:7:19 on $\overline{Q}_{ij}^{\theta}$ depends on the offset distance of individual plies from the midplane, which is different form the ratio 1:1:1 required for an isotropic matrix. Thus, $D_{ij}$ is anisotropic.

In Table 3, the weighting factors for $A_{ij}$ and $D_{ij}$ are summarized for comparison. Due to the layup symmetry with respect to the laminate midplane, only the data associated with a half laminate are listed. (This simplification does not effect the discussion). The ply located immediately adjacent to the midplane is designated as Ply 1 in the table. The one next to Ply 1 is Ply 2, ..., and so on.

TABLE 3

Weighting Factors of a π/3-type 6-ply EIL

| Angle | 0° | 60° | −60° |
|---|---|---|---|
| Ply ID (k) | 1 | 2 | 3 |
| $3k^2 − 3k + 1$ | 1 | 7 | 19 |
| Weighting factor for $A_{ij}$ (No. of plies) | 1 | 1 | 1 |
| Weighting factor for $D_{ij}$ ($\Sigma 3k^2 − 3k + 1$) | 1 | 7 | 19 |

Note that the ratio of 1:7:19 is the cause for the anisotropy of $D_{ij}$. Because there is only one factor associated with each ply angle in this layup, all six combinations of stacking sequence listed in Table 2 would yield the same ratio 1:7:19. Therefore, this 6-ply EIL cannot be made into an FIL.

However, if we take EILs of relatively many plies and vary their stacking sequence (which translates to re-grouping the weighting factors) until the summations of weighting factors for each orientation become identical, we should obtain an FIL. This mechanics problem is thus reduced to an integer problem (hereinafter designated as the FIL Integer Model) as follows:

There is a series of K integers expressed as 1, 7, 19, . . ., $3K^2−3K+1$ where K=M×N. M(≧1) and N(≧3) are both integers. These K integers are to be distributed evenly into N groups such that each group holds M integers. The objective is to find a distribution pattern such that the summations of integers in every group are identical.

We know that the integer N is associated with the number of ply orientation and that M corresponds to the number of plies in each orientation. A computer program has been developed to systematically search through all the distribution patterns of K integers distributed in N groups. Each integer distribution pattern that satisfies the objective of "equal sum" constitutes a stacking sequence for an FIL. Some solutions are listed below for further explanation.

1.3 Partial Listing of the FILs

Using the FIL integer model, a computerized search has been conducted over a series of EILs of various ply angles and ply numbers. The ranges of these ply parameters are listed in Table 1. For instance, during the search for the $\pi/3$-type FILs, the ply numbers are increased in the following order:

6, 12, 18, 24, 30, 36, 42, 48, 54, ...

and we have obtained FILs in the 36- and 54-ply laminates. No FIL is found for the laminates of few plies due to the limited combination of stacking sequence. However, the lack of $\pi/3$-type FILs in 42- and 48-ply laminates indicates that increasing the ply number does not guarantee that FILs will be found. Although more FILs can be found as we further increase the ply number beyond 54, this pattern of discrete FIL discovery should continue. Similar patterns of discrete FIL discovery are observed in other types of EIL.

In the following, a few FIL layup solutions are listed according to the type designated as $\pi/N$. A $\pi/N$-type FIL has a total of N ply orientation angles, with the angles equally spaced by $\pi/N$.

$\pi/3$-type FILs

The first group of $\pi/3$-type FILs is discovered in the $\pi/3$-type 36-ply EILs. The computerized search has found 89 FILs out of a total of 2,858,856 EIL stacking sequences, which translates to a probability of $3.1 \times 10^{-5}$ in finding an FIL within the $\pi/3$-type 36-ply EILs if a random trial-and-error process is used. A complete list of all 89 FILs is included in the appendix. Table 4 lists an FIL and the pertinent data for verification of full isotropy.

Due to the symmetry with respect to the midplane, only the stacking sequence in half thickness of the laminate is listed. The ply located immediately adjacent to the laminate midplane is designated as Ply 1 in the table. The one next to Ply 1 is Ply 2, ..., and so on. $\theta_1$ through $\theta_3$ indicate any three orientation angles equally spaced by $\pi/3$.

The third row, $3k^2 - 3k + 1$, lists the value of the weighting factor associated with each ply for $D_{ij}$.

The fourth row shows the number of plies in each orientation. Clearly, the isotropy of $A_{ij}$ is preserved as each orientation angle has the same number (6) of plies. The effect of ply numbers on the isotropy of $A_{ij}$ can be seen as follows.

$$A_{ij} = 2 \sum_{k=1}^{18} (\overline{Q}_{ij})_k \Delta t \quad (7)$$

$$= 2 \left( \sum_{k=1,2,3,13,15,17} \overline{Q}_{ij}^{\theta_1} + \sum_{k=4,6,8,11,12,18} \overline{Q}_{ij}^{\theta_2} + \sum_{k=5,7,9,10,14,16} \overline{Q}_{ij}^{\theta_3} \right) \Delta t$$

$$= 2(6\overline{Q}_{ij}^{\theta_1} + 6\overline{Q}_{ij}^{\theta_2} + 6\overline{Q}_{ij}^{\theta_3})\Delta t$$

$$= 12(\overline{Q}_{ij}^{\theta_1} + \overline{Q}_{ij}^{\theta_2} + \overline{Q}_{ij}^{\theta_3})\Delta t$$

In Table 4, the fifth row sums the ply weighting factors at the third row to attain the orientation weighting factors for $D_{ij}$. As each orientation angle has the same weighting factor, 1944, the isotropy of $D_{ij}$ is obtained. The effect of this factor can be seen through computation of $D_{ij}$ as follows.

$$D_{ij} = \frac{2}{3} \sum_{k=1}^{18} (3k^2 - 3k + 1)(Q_{ij})_k (\Delta t)^3 \quad (8)$$

$$= \frac{2}{3} \left[ \sum_{k=1,2,3,13,15,17} (3k^2 - 3k + 1) Q_{ij}^{\theta_1} + \sum_{k=4,6,8,11,12,18} (3k^2 - 3k + 1) Q_{ij}^{\theta_2} + \sum_{k=5,7,9,10,14,16} (3k^2 - 3k + 1) Q_{ij}^{\theta_3} \right] (\Delta t)^3$$

$$= \frac{2}{3} (1944 Q_{ij}^{\theta_1} + 1944 Q_{ij}^{\theta_2} + 1944 Q_{ij}^{\theta_3})(\Delta t)^3$$

$$= 1296(Q_{ij}^{\theta_1} + Q_{ij}^{\theta_2} + Q_{ij}^{\theta_3})(\Delta t)^3$$

$$= \frac{t^2}{12} A_{ij}$$

where $t = 36\Delta t$. Because $\theta_1$ through $\theta_3$ represent three angle equally spaced by $\pi/3$, the ratio of weighting factors 1:1:1 for three $\overline{Q}_{ij}^{\theta}$ in both Equations (7) and (8) signifies the necessary and sufficient condition for full isotropy as described in Equations (2) through (4).

TABLE 4

| | A $\pi/3$-type 36-ply FIL | | | | | | | | | | |
|---|---|---|---|---|---|---|---|---|---|---|---|
| Angle | $\theta_1$ | | | | $\theta_2$ | | | | $\theta_3$ | | |
| Ply ID (k) | 1 | 2 | 3 | 13 | 4 | 6 | 8 | 11 | 5 | 7 | 9 | 10 |
| | 15 | 17 | | | 12 | 18 | | | 14 | 16 | | |
| $3k^2 - 3k + 1$ | 1 | 7 | 19 | 469 | 37 | 91 | 169 | 331 | 61 | 127 | 217 | 271 |
| | 631 | 817 | | | 397 | 919 | | | 547 | 721 | | |
| Weighting factor for $A_{ij}$ (No. of plies) | 6 | | | | 6 | | | | 6 | | | |
| Weighting factor for $D_{ij}$ ($\Sigma 3k^2 - 3k + 1$) | 1944 | | | | 1944 | | | | 1944 | | | |

In Table 4, the second row Ply ID (k) specifies the ply stacking sequence.

Thus, a $\pi/3$-type FIL is invented and verified.

The second group of $\pi/3$-type FILs is discovered in the $\pi/3$-type 54-ply EILs. The computerized search has found 111,816 FILs; however, this number represents a probability of $2.7 \times 10^{-11}$ in finding an FIL within the $\pi/3$-type 54-ply EILs if a random trial-and-error process is used. Table 5 lists a 54-ply FIL layup; the full isotropy in this FIL can be verified through similar procedures involved in Table 4, Equation (7), and Equation (8).

TABLE 5

| | A $\pi/3$-type 54-ply FIL | | |
|---|---|---|---|
| Angle | $\theta_1$ | $\theta_2$ | $\theta_3$ |
| Ply ID | 1 2 3 4 5 24 26 27 | 16 6 7 8 9 11 18 22 23 25 | 10 12 13 14 15 17 19 20 21 |

Although there are many more $\pi/3$-type FILs found beyond the 54-ply laminate, a complete list is omitted due to page limitations.

$\pi/4$-type FILs

The first group of $\pi/4$-type FILs is discovered in the $\pi/4$-type 48-ply EILs. (No $\pi/4$-type FIL is found in the laminates of fewer than 48 plies.) The computerized search has found 1,501 FILs; however, this number represents a probability of $1.5 \times 10^{-8}$ in finding an FIL within the $\pi/4$-type 48-ply EILs if a random trial-and-error process is used. Table 6 lists an FIL layup, where $\theta_1$ through $\theta_4$ indicate any four orientation angles equally spaced by $\pi/4$. The full isotropy in this FIL can be verified through similar procedures involved in Table 4, Equation (7), and Equation (8).

TABLE 6

| | A $\pi/4$-type 48-ply FIL | | | |
|---|---|---|---|---|
| Angle | $\theta_1$ | $\theta_2$ | $\theta_3$ | $\theta_4$ |
| Ply ID | 1 2 3 15 20 24 | 4 5 6 16 19 23 | 7 10 11 14 18 21 | 8 9 12 13 17 22 |

Although there are many more $\pi/4$-type FILs found beyond the 48-ply laminate, a complete list is omitted due to page limitations.

$\pi/5$-type FILs

The first group of $\pi/5$-type FILs is discovered in the $\pi/5$-type 50-ply EILs. (No $\pi/5$-type FIL is found in the laminates of fewer than 50 plies.) The computerized search has found 148 FILs; however, this number represents a probability of $2.8 \times 10^{11}$ in finding an FIL within the $\pi/5$-type 50-ply EILs if a random trial-and-error process is used. Table 7 lists an FIL layup, where $\theta_1$ through $\theta_5$ indicate any five orientation angles equally spaced by $\pi/5$. The full isotropy in this FIL can be verified through similar procedures involved in Table 4, Equation (7), and Equation (8).

TABLE 7

| | A $\pi/5$-type 50-ply FIL | | | | |
|---|---|---|---|---|---|
| Angle | $\theta_1$ | $\theta_2$ | $\theta_3$ | $\theta_4$ | $\theta_5$ |
| Ply ID | 1 2 13 21 22 | 3 10 14 15 24 | 4 6 8 19 25 | 5 11 12 17 23 | 7 9 16 18 20 |

Although there are many more $\pi/5$-type FILs found beyond the 50-ply laminate, a complete list is omitted due to page limitations.

$\pi/6$-type FILs

The first group of $\pi/6$-type FILs is found in the 72-ply EILs. (No $\pi/6$-type FIL is found in the laminates of fewer than 72 plies.) Table 8 lists an FIL layup, where $\theta_1$ through $\theta_6$ indicate any six orientation angles equally spaced by $\pi/6$. The full isotropy in this FIL can be verified through similar procedures involved in Table 4, Equation (7), and Equation (8).

TABLE 8

| | A $\pi/6$-type 72-ply FIL | | | | | |
|---|---|---|---|---|---|---|
| Angle | $\theta_1$ | $\theta_2$ | $\theta_3$ | $\theta_4$ | $\theta_5$ | $\theta_6$ |
| Ply ID | 1 2 12 35 | 3 4 36 26 | 5 6 28 34 | 7 8 24 29 | 9 10 33 20 | 11 15 30 31 | 13 14 21 25 | 16 17 32 22 | 18 19 23 27 |

Although there are many more $\pi/6$-type FILs found beyond the 72-ply laminate, a complete list is omitted due to page limitations.

$\pi/7$- through $\pi/N$-type FILs

Although there are many more FILs found beyond the $\pi/6$-type laminate, a complete list is omitted due to page limitations.

2. Quasi-Homogeneous Anisotropic Laminates (QHAL)

2.1 Definition

A QHAL is a laminate that has identical stiffness anisotropy in extension and bending as well as in shear and twisting. In classical lamination theory, the macromechanical behavior or a QHAL is characterized by Equations (3) and (4), i.e.

$$B_{ij} = 0 \tag{3}$$

$$D_{ij} = \frac{t^2}{12} A_{ij} \tag{4}$$

Equation (3) is for the null coupling stiffness that can be satisfied with a symmetric layup.

Equation (4) is for a constant relationship between the matrices $A_{ij}$ and $D_{ij}$. Note that, with the removal of Equation (2) for isotropy requirement, both $A_{ij}$ and $D_{ij}$ could become anisotropic. However, being related to just the constant $t^2/12$, both matrices are required to have the identical anisotropy indicated by Equation (4). The following describes the approaches used to meet this requirement and obtain a QHAL.

2.2 Approaches

There are two approaches to obtain a QHAL.

I. The first approach is to take an FIL layup (as those listed in Section 1.3) and remove the constraint on the ply orientation angles such that $\theta_n$'s are no longer equally spaced by $\pi/N$ (each group of plies with the same angle can be oriented independent of another group of different angle). Thus, the layup symmetry is still preserved while anisotropy is introduced to the laminate.

For example, we can take the FIL layup listed in Table 4 and remove the constraint on $\theta_1$, $\theta_2$, and $\theta_3$ such that all three angles are independent of one another. Thus, $\overline{Q}_{ij}^{\theta 1}+\overline{Q}_{ij}^{\theta 2}+\overline{Q}_{ij}^{\theta 3}$ becomes anisotropic; and so do $A_{ij}$ and $D_{ij}$ as indicated by Equations (7) and (8). With $\theta_1$ through $\theta_3$ independent of one another, Equations (7) and (8) are still valid for proving the constant relationship between $A_{ij}$ and $D_{ij}$ as required by Equation (4).

Therefore, by relaxing the constraint on ply angles, every FIL layup corresponds to a QHAL layup that is referred to as the special QHAL.

II. The second approach to obtain a QHAL is by solving a slightly complicated integer problem (hereinafter designated as the QHAL Integer Model) stated in the following.

There is a series of K integers expressed as 1, 7, 19, ..., $3K^2-3K+1$. These K integers are to be distributed into N groups such that the ratios of the numbers of integers in each group equal $\alpha_1:\alpha_2:\alpha_3: \ldots :\alpha_N$. The objective is to find a distribution pattern of integers such that ratios of the sums in every integer group also equal $\alpha_1:\alpha_2:\alpha_3: \ldots :\alpha_N$.

We know that, in the above problem, the integer N is associated with the number of ply orientations and that the number of integers in each group correspond to the number of plies in each orientation. A computer program has been developed to systematically search through all the distribution patterns of K integers in N groups. Each integer distribution pattern that satisfies the objective constitutes a stacking sequence for a QHAL. The QHAL layup obtained with this approach may not relate to any FIL layup and is therefore referred to as the general QHAL.

Table 9 lists the stacking sequence of a 48-ply general QHAL with a symmetric layup. Note that $\theta_1$ through $\theta_3$ represent any three independent ply angles.

to 1:1:2. The effect of the ply numbers on $A_{ij}$ can be seen as follows.

$$A_{ij} = 2 \sum_{k=1}^{24} (\overline{Q}_{ij})_k \Delta t \qquad (9)$$

$$= 2 \left( \sum_{k=1,2,3,19,20,21} \overline{Q}_{ij}^{\theta 1} + \sum_{k=4,6,8,16,18,23} \overline{Q}_{ij}^{\theta 2} + \sum_{k=5,7,9,10,11,12,13,14,15,17,22,24} \overline{Q}_{ij}^{\theta 3} \right) \Delta t$$

$$= 2(6\overline{Q}_{ij}^{\theta 1} + 6\overline{Q}_{ij}^{\theta 2} + 12\overline{Q}_{ij}^{\theta 3})\Delta t$$

$$= 12(\overline{Q}_{ij}^{\theta 1} + \overline{Q}_{ij}^{\theta 2} + 2\overline{Q}_{ij}^{\theta 3})\Delta t$$

In Table 9, the fifth row sums the ply weighting factors in the third row to attain the orientation weighting factors for $D_{ij}$, in which the ratio of 3456:3456:6912 can be equated to 1:1:2. The effect of these factors on $D_{ij}$ can be seen through the computation as follows.

$$D_{ij} = \frac{2}{3} \sum_{k=1}^{24} (3k^2 - 3k + 1)(\overline{Q}_{ij})_k (\Delta t)^3 \qquad (10)$$

$$= \frac{2}{3} \left[ \sum_{k=1,2,3,19,20,21} (3k^2 - 3k + 1)\overline{Q}_{ij}^{\theta 1} + \sum_{k=4,6,8,16,18,23} (3k^2 - 3k + 1)\overline{Q}_{ij}^{\theta 2} + \sum_{k=5,7,9,10,11,12,13,14,15,17,22,24} (3k^2 - 3k + 1)\overline{Q}_{ij}^{\theta 3} \right] (\Delta t)^3$$

$$= \frac{2}{3} (3456\overline{Q}_{ij}^{\theta 1} + 3456\overline{Q}_{ij}^{\theta 2} + 6912\overline{Q}_{ij}^{\theta 3})(\Delta t)^3$$

$$= 2304(\overline{Q}_{ij}^{\theta 1} + \overline{Q}_{ij}^{\theta 2} + 2\overline{Q}_{ij}^{\theta 3})(\Delta t)^3$$

$$= \frac{t^2}{12} A_{ij}$$

TABLE 9

| | A 48-ply symmetric QHAL with N = 3 and $a_1:a_2:a_3$ = 1:1:2 | | | | | | | | | | |
|---|---|---|---|---|---|---|---|---|---|---|---|
| Angle | $\theta_1$ | | | | $\theta_2$ | | | | $\theta_3$ | | |
| Ply ID (k) | 1 | 2 | 3 | 19 | 4 | 6 | 8 | 16 | 5 | 7 | 9 | 10 |
| | 20 | 21 | | | 18 | 23 | | | 11 | 12 | 13 | 14 |
| | | | | | | | | | 15 | 17 | 22 | 24 |
| $3k^2-3k+1$ | 1 | 7 | 19 | 1027 | 37 | 91 | 169 | 721 | 61 | 127 | 217 | 271 |
| | 1141 | 1261 | | | 919 | 1519 | | | 331 | 397 | 469 | 547 |
| | | | | | | | | | 631 | 817 | 1387 | 1657 |
| Weighting factor for $A_{ij}$ (No. of plies) | 6 | | | | 6 | | | | 12 | | | |
| Weighting factor for $D_{ij}$ ($\Sigma 3k^2 - 3k + 1$) | 3456 | | | | 3456 | | | | 6912 | | | |

In Table 9, the second row Ply ID (k) specifies the ply stacking sequence.

The third row, $3k^2-3k+1$, lists the value of the weighting factor associated with each ply for $D_{ij}$.

The fourth row shows the number of plies in each orientation, in which the ratio of 6:6:12 can be equated where $t=48\Delta t$. Note that the weighting ratio of 1:1:2 for three ply angles is achieved simultaneously for both $A_{ij}$ and $D_{ij}$ matrices. Although both matrices are anisotropic, they maintain the identical anisotropy that satisfies Equation (4); and a QHAL layup is invented and verified.

Although there are many more QHALs for various ply numbers and engineering requirements, a complete list is omitted due to page limitations.

With the above two approaches, we can obtain various type of QHAL layup for various engineering requirements. The characteristic of identical stiffness anisotropy in both $A_{ij}$ and $D_{ij}$ has been found only in homogeneous anisotropic plates, which is often desirable in the composite application though was never before achieved with a multiply multiangle laminate.

3. Applications of FIL and QHAL as Plates and Shells

The FIL and the QHAL have very useful applications for load-carrying laminates.

i. An FIL provides the same stiffness reinforcement in all directions, which eliminates the concern for the "weak aspect" in the structural element and eases the engineering consideration of composite laminates.

ii. A QHAL, with identical anisotropy in both $A_{ij}$ and $D_{ij}$, provides the maximum (and minimum) in-plane and out-of-plane reinforcements in the same direction. Thus, 4. Asymmetric Layup Throughout the above discussion of FIL and QHAL, the requirement of a symmetric layup with respect to the midplane is always emphasized to eliminate the coupling stiffness $B_{ij}$. However, there are circumstances that $B_{ij}=0$ can be achieved by using asymmetric layups.

Table 10 lists an asymmetric layup that uses different FIL layups in each half of the laminate and yields no coupling stiffness. The ply located immediately adjacent to the laminate midplane is designated as Ply 1. The one next to Ply 1 is Ply 2, ..., and so on. Positive ID's indicate plies above the midplane while negative ID's indicate plies below the midplane. $\theta_1$ through $\theta_3$ indicate any three angles equally spaced by $\pi/3$.

TABLE 10

| Angle | $\theta_1$ | | | | | | $\theta_2$ | | | | | | $\theta_3$ | | | | | |
|---|---|---|---|---|---|---|---|---|---|---|---|---|---|---|---|---|---|---|
| A 36-ply Null-Coupling Asymmetric FIL | | | | | | | | | | | | | | | | | | |
| Ply ID | 1 | 2 | 3 | 13 | 15 | 17 | 4 | 6 | 8 | 11 | 12 | 18 | 5 | 7 | 9 | 10 | 14 | 16 |
|  | −1 | −3 | −5 | −7 | −17 | −18 | −2 | −6 | −10 | −12 | −14 | −15 | −4 | −8 | −9 | −11 | −13 | −16 |

Although the above asymmetric layup yields no coupling stiffness, in general, an asymmetric layup using FILs can introduce a coupling stiffness in addition to the intrinsic stiffness isotropy to a laminate. Table 11 lists such an asymmetric layup with $\theta_1$ through $\theta_3$ indicate any three angles equally spaced by $\pi/3$.

TABLE 11

| Angle | $\theta_1$ | | | | | | $\theta_2$ | | | | | | $\theta_3$ | | | | | |
|---|---|---|---|---|---|---|---|---|---|---|---|---|---|---|---|---|---|---|
| A 36-ply Asymmetric Layup using $\pi/3$-type FILs | | | | | | | | | | | | | | | | | | |
| Ply ID | 1 | 2 | 3 | 13 | 15 | 17 | 4 | 6 | 8 | 11 | 12 | 18 | 5 | 7 | 9 | 10 | 14 | 16 |
|  | −1 | −2 | −4 | −14 | −15 | −16 | −3 | −5 | −9 | −11 | −12 | −18 | −6 | −7 | −8 | −10 | −13 | −17 | a QHAL is a layup for maximum weight reduction is a laminated structure.

In addition, the FIL and the QHAL have greatly reduced the effort that is necessary for analyzing their macromechanical response.

Because of the structural complexity in a laminate, it has always been a tedious and complicated task to perform a mechanical analysis that involves all three matrices, $A_{ij}$, $B_{ij}$, and $D_{ij}$. The basic complication to a mechanical analysis is due to the fact that $A_{ij}$ and $D_{ij}$ are independent of each other in most of the laminates. However, this complication is removed by the present invention. First, in the FIL and the QHAL layups, $A_{ij}$ and $D_{ij}$ are related by the constant $t^2/12$. Second, with a symmetric stacking sequence, a null coupling stiffness $B_{ij}$ can be deleted from the analysis. In other words, the macromechanical behavior of an FIL is identical to that of a homogeneous isotropic plate while the macromechanical behavior of a QHAL is identical to that of a homogeneous anisotropic plate. Therefore, the classical theories and formulations for the homogeneous thin plates and curved shells are all applicable to the macromechanical analyses of the FIL and QHAL, which is a breakthrough in laminate analysis.

Note that, to ease the technical discussion, the geometry of flat laminates has been used to describe the FIL and the QHAL layups. However, it is apparent that the application of FIL and QHAL are equally advantageous to both flat and curved laminates in every aspects described above.

Similarly, an asymmetric layup using QHALs can introduce a coupling stiffness in addition to the intrinsic identical stiffness anisotropy to a laminate. In summary, when the coupling stiffness is desirable in addition to the characteristics of FIL and QHAL, asymmetric layups can be applied.

There are numerous ways to form asymmetric laminates using FIL and QHAL layups. A complete list is omitted due to page limitations.

Having thus described the invention with particular reference to preferred embodiments, it will be obvious to those having ordinary skill in the art to which the invention pertains that numerous variations and changes can be made without departing from the spirit and scope of the inventions as defined in the appended claims.

What is claimed is:

1. The multiply multiangle laminate, which consists of at least six plies of at least three different orientations, wherein each ply is of an identical uniform thickness, of one orthotropic or anisotropic material, wherein on either side of the midplane of the laminate
   (a) there are the same total number of plies aligned in each orientation;
   (b) the orientation angles are equally spaced;
   (c) the layup sequence is defined by the following:
      (i) each ply is assigned a value, k, an integer number that represents the stacking order of the ply from the midplane, therefore k=1 is for the play closest to the midplane, k=2 is for the ply adjacent to ply 1, and so forth;
      (ii) each ply is assigned a weighting factor equal to $3k^2-3k+1$, where k is defined in (i);

(iii) the sums of the weighting factors of all the plies in each orientation are identical;

wherein each side of the laminate has the same numbers of orientations and plies, and the resulting laminate has concomitant isotropy in extensional, shear, bending, and twisting stiffnesses; the said bending stiffness equals to the extensional stiffness multiplied by a constant, $t^2/12$, and the said twisting stiffness equals to the said shear stiffness multiplied by the same constant, $t^2/12$, wherein t is the thickness of the entire laminate.

2. The multiply multiangle laminate, which consists of at least four plies of at least two different orientations, wherein each ply is of an identical uniform thickness, of one orthotropic or anisotropic material, wherein the layup sequence on either side of the midplane of the laminate is defined by the following:

(a) each play is assigned a value, k, an integer number that represents the stacking order of the ply from the midplane, therefore k=1 is for the ply closest to the midplane, k=2 is for the ply adjacent to ply 1, and so forth;

(b) each ply is assigned a weighting factor equal to $3k^2-3k+1$, where k is defined in (a);

(c) the ratio of the sums of the weighting factors of all the plies in each orientation is equal to the ratio of the total numbers of plies aligned in each orientation;

wherein each side of the laminate has the same orientation angles with respect to a reference axis fixed in the midplane of the laminate, each side of the laminate has the same number of orientations and plies, and the resulting laminate has anisotropic extensional, shear, bending, and twisting stiffnesses; the said bending stiffness equals to the extensional stiffness multiplied by a constant, $t^2/12$, and the same twisting stiffness equals to the said shear stiffness multiplied by the same constant, $t^2/12$, where t is the thickness of the entire laminate.

3. The laminate of claim 1 or 2, wherein the said plies are of uniform thickness $\Delta t$ and a number, n, of adjacent plies having the same orientation angle can therefore be combined into one play of the same orientation angle having a thickness of $n\Delta t$.

4. The laminate of claim 1 or 2, wherein the laminate is in the form of a planar plate.

5. The laminate of claim 1 or 2, wherein the laminate is in the form of a curved shell.

* * * * *